United States Patent
Li et al.

(10) Patent No.: US 11,940,528 B1
(45) Date of Patent: Mar. 26, 2024

(54) METHOD AND SYSTEM FOR EVALUATING SONAR SELF-NOISE AT SHIP DESIGN STAGE

(71) Applicant: Harbin Engineering University, Harbin (CN)

(72) Inventors: Haichao Li, Harbin (CN); Jiawei Xu, Harbin (CN); Fuzhen Pang, Harbin (CN); Cong Gao, Harbin (CN); Yuhang Tang, Harbin (CN); Jiajun Zheng, Harbin (CN); Xueren Wang, Harbin (CN); Zhe Zhao, Harbin (CN); Xuhong Miao, Harbin (CN); Yuan Du, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/383,150

(22) Filed: Oct. 24, 2023

(30) Foreign Application Priority Data

Nov. 4, 2022 (CN) .......................... 202211377478.7

(51) Int. Cl.
*G01S 15/00* (2020.01)
*G06F 30/20* (2020.01)

(52) U.S. Cl.
CPC ............ *G01S 15/006* (2013.01); *G06F 30/20* (2020.01)

(58) Field of Classification Search
CPC ............................... G01S 15/006; G06F 30/20
See application file for complete search history.

(56) References Cited

FOREIGN PATENT DOCUMENTS

| | | | | |
|---|---|---|---|---|
| CN | 107944108 A | * | 4/2018 | ............. G06F 17/50 |
| CN | 109143208 A | * | 1/2019 | ............... G01S 7/52 |
| CN | 109212511 A | * | 1/2019 | ............... G01S 7/52 |
| CN | 110069873 A | | 7/2019 | |

OTHER PUBLICATIONS

Tang Y, Wang X, Li H, Gao C, Miao X. Experimental research on interior field noise and the vibration characteristics of composite reinforced sheet-beam structures. Applied Acoustics. Mar. 1, 2020;160:107154. (Year: 2020).*

* cited by examiner

*Primary Examiner* — Chuen-Meei Gan
(74) *Attorney, Agent, or Firm* — IPRO, PLLC; Na Xu

(57) ABSTRACT

Disclosed are a method and system for evaluating sonar self-noise at a ship design stage. The method includes: building a ship structure full-scale geometric simulation model; acquiring loss factors and sonar transducer space outfitting acoustic absorption coefficient material parameters; acquiring mechanical excitation, hydrodynamic excitation, and propeller excitation; inputting the loss factors and the sonar transducer space outfitting acoustic absorption coefficient material parameters into an established statistical energy evaluation model, and applying a mechanical excitation to a face plate of foundation of the built ship structure full-scale geometric simulation model, applying a hydrodynamic excitation to the surface of a ship hull, and applying a propeller excitation to a stern shaft to perform calculation of sonar self-noise of a ship to obtain total spectral density level of the sonar self-noise; and evaluating spectral density level calculation results by index requirements. The method is applicable in risk evaluation of sonar self-noise indexes.

9 Claims, 7 Drawing Sheets

METHOD AND SYSTEM FOR EVALUATING SONAR SELF-NOISE AT SHIP DESIGN STAGE

TECHNICAL FIELD

The disclosure herein relates to the field of ship vibration and noise reduction technologies, and in particular relates to a method and system for evaluating sonar self-noise at a ship design stage.

BACKGROUND

Sonar is a device to detect the direction, position, and features of a target in the ocean, and is an indispensable part of a ship during navigation. Sonar self-noise of the ship is one of important factors affecting the sonar detection performance of the ship. Therefore, reducing the self-noise can improve the detection ability of the sonar and increase the detection distance of the sonar. The sonar self-noise mainly comes from three major sources: mechanical noise, hydrodynamic noise, and propeller noise. The actual measurement shows that the sonar self-noise at low and medium speeds is mainly the mechanical noise, and reducing the mechanical noise is a key measure for the level of the sonar self-noise at the low and medium speeds to reach the standard. The sonar self-noise at a high speed is mainly the hydrodynamic noise. The hydrodynamic noise will increase rapidly with the increase of the speed, and it will become one of core factors affecting that the level of the sonar self-noise at the high speed reaches the standard. Therefore, it is particularly important to evaluate the level of the sonar self-noise of the ship to provide a technical support for a low-noise design of a ship sonar system.

At present, related technologies mainly include: related technology I: Research on Characteristics of Self-Noise and Optimization of Noise Reduction Measures for Sonar Platform (Ship & Ocean Engineering, December 2014, Issue 6); related technology II: Prediction Method and Control Technology for Self-noise of Ship Sonar Part (Ship Dynamics, October 2002, Issue 5); related technology III: Statistical Energy Analysis to Calculate Hydrodynamic Noise Component of Sonar Self-Noise (Ship Dynamics, February 2004, Issue 1), where in the related technology I, statistical energy analysis is utilized to discuss the influence of mechanical and hydrodynamic loads on the self-noise characteristics of the sonar platform, and three different forms of noise reduction measures are proposed, but a specific self-noise evaluation method is not mentioned, which is difficult to implement and affect the efficiency; in the related technology II, the prediction method and control technology for the sonar self-noise are comprehensively reviewed, but a model is complex, and the accuracy influence of an acoustic cavity is not considered; and in the related technology III, the statistical energy analysis is employed to establish a calculation model for the hydrodynamic noise component in self-noise, and the influences of different hood wall materials and acoustic absorption treatment on the sonar self-noise are calculated and analyzed. However, the influence of the mechanical noise and the propeller noise on the sonar self-noise is not considered.

SUMMARY

The disclosure aims to at least solve one of the technical problems in the related art to a certain extent.

To this end, one object of the disclosure is to propose a method for evaluating sonar self-noise at a ship design stage.

Another object of the disclosure is to propose a system for evaluating sonar self-noise at a ship design stage.

Yet another object of the disclosure is to propose a computer device.

Still another object of the disclosure is to propose a non-transitory computer-readable storage medium.

In order to achieve the above objects, embodiments of the disclosure in an aspect propose a method for evaluating sonar self-noise at a ship design stage, including the following steps: step S1: sorting out modeling parameters according to preset ship blueprint data, and building a scale geometric model according to the modeling parameters; step S2: establishing a statistical energy evaluation model based on a statistical energy basic principle, and building a ship structure full-scale geometric simulation model and an acoustic cavity subsystem by using the scale geometric model; step S3: acquiring loss factors and sonar transducer space outfitting acoustic absorption coefficient material parameters, where the loss factors include a structural loss factor and an acoustic cavity internal loss factor; step S4: acquiring a mechanical excitation load, a hydrodynamic excitation load, and a propeller excitation load; step S5: inputting the loss factors and the sonar transducer space outfitting acoustic absorption coefficient material parameters into the statistical energy evaluation model, and applying the mechanical excitation load to a face plate of foundation of the ship structure full-scale geometric simulation model, applying the hydrodynamic excitation to the surface of a ship hull, and applying the propeller excitation load to a stern shaft to perform calculation of the sonar self-noise of the ship to obtain the total spectral density level of the sonar self-noise; and step S6: evaluating spectral density level calculation results at 100 Hz, 1 kHz, and 10 kHz frequency points by preset index requirements, if the preset index requirements are not met, iteratively optimizing steps S3 to S6 before evaluation, and otherwise, carrying out a next stage of operation.

According to the method for evaluating sonar self-noise at a ship design stage of the embodiment of the disclosure, the spectral density level of a ship sonar transducer space is pre-estimated under the navigation condition according to a ship design scheme with mechanical vibration noise excitation, fluid excitation, and propeller excitation as inputs, and the risk level of sonar self-noise indexes at the ship design stage is evaluated by comparing with sonar self-noise index requirements, thereby effectively improving the prediction efficiency and accuracy of the sonar self-noise of the ship.

In addition, the method for evaluating sonar self-noise at a ship design stage according to the above embodiments of the disclosure may also have the following additional technical features:

Further, in one embodiment of the disclosure, the scale geometric model includes a hull structure, a base, a bulkhead, a deck platform, and a sonar transducer space structure, as well as the dimension of each structure and hull plating thickness parameters.

Further, in one embodiment of the disclosure, step S2 specifically includes: step S201: establishing the statistical energy evaluation model based on the statistical energy basic principle; step S202: establishing the ship structure full-scale geometric simulation model based on the scale geometric model; and step S203: performing space fine division on a key-assessed sonar transducer space region in the ship structure full-scale geometric simulation model, and building the acoustic cavity subsystem according to spaces obtained by fine division.

Further, in one embodiment of the disclosure, step S3 specifically includes: step S301: determining the structural loss factor and the acoustic cavity internal loss factor of the ship structure full-scale geometric simulation model based on a transient attenuation method by employing model experimental testing; and step S302: acquiring the sonar transducer space outfitting acoustic absorption coefficient material parameters in the ship structure full-scale geometric simulation model by employing an impedance tube testing method and a transfer matrix analysis method.

Further, in one embodiment of the disclosure, step S4 specifically includes: step S401: acquiring the mechanical excitation load of the ship structure full-scale geometric simulation model based on bench testing results of engine mount vibration of a parent device, where the mechanical excitation load includes a vibration acceleration level load and an acoustic power level load; step S402: determining the hydrodynamic excitation load applied to the hull surface of the ship structure full-scale geometric simulation model at a preset speed according to the navigation condition of a ship design; and step S403: acquiring the propeller excitation of the ship structure full-scale geometric simulation model according to actual ship testing results (CFD).

Further, in one embodiment of the disclosure, the calculation of the sonar self-noise of the ship in step S5 specifically includes: setting frequency response analysis to ⅓ octave frequency, setting a calculation frequency band to 100 Hz to 10 kHz, and performing calculation of the sonar self-noise of the ship; converting calculated acoustic pressure level results of each acoustic cavity obtained by division in the sonar transducer space into spectral density levels; and performing energy superposition on multiple spectral density level results to obtain the total spectral density level of the sonar self-noise.

Further, in one embodiment of the disclosure, step S6 specifically includes: solving average energy values at 100 Hz, 1 kHz, and 10 kHz frequency points in the total spectral density level of the sonar self-noise, if the average energy value is less than 3 dB or more of the preset index requirement, continuing the next stage of operation, where the preset index requirement can be implemented, if the average energy value is less than 3 dB or less of the preset index requirement, continuing the next stage of operation, where the preset index requirement has a risk, and otherwise, the preset index requirement has a high risk, then iteratively optimizing steps S3 to S6 before evaluation.

In order to achieve the above objects, embodiments of the disclosure in another aspect propose a system for evaluating sonar self-noise at a ship design stage, including: a geometric model building module, configured to sort out modeling parameters according to preset ship blueprint data, and build a scale geometric model according to the modeling parameters; a simulation model building module, configured to establish a statistical energy evaluation model based on a statistical energy basic principle, and build a ship structure full-scale geometric simulation model and an acoustic cavity subsystem by using the scale geometric model; a parameter acquisition module, configured to acquire loss factors and sonar transducer space outfitting acoustic absorption coefficient material parameters, where the loss factors include a structural loss factor and an acoustic cavity internal loss factor; an excitation load acquisition module, configured to acquire a mechanical excitation load, a hydrodynamic excitation load, and a propeller excitation load; a self-noise calculation module, configured to input the loss factors and the sonar transducer space outfitting acoustic absorption coefficient material parameters into the statistical energy evaluation model, and apply the mechanical excitation load to a face plate of foundation of the ship structure full-scale geometric simulation model, apply the hydrodynamic excitation to the surface of a ship hull, and apply the propeller excitation load to a stern shaft to perform calculation of the sonar self-noise of the ship to obtain the total spectral density level of the sonar self-noise; and an evaluation module, configured to evaluate spectral density level calculation results at 100 Hz, 1 kHz, and 10 kHz frequency points by preset index requirements, if the preset index requirements are not met, iteratively optimize the parameter acquisition module to the evaluation module before evaluation, and otherwise, carry out the next stage of operation.

According to the system for evaluating sonar self-noise at a ship design stage of the embodiment of the disclosure, the spectral density level of a ship sonar transducer space is pre-estimated under the navigation condition according to a ship design scheme with mechanical vibration noise excitation, fluid excitation, and propeller excitation as inputs, and the risk level of sonar self-noise indexes at the ship design stage is evaluated by comparing with sonar self-noise index requirements, thereby effectively improving the prediction efficiency and accuracy of the sonar self-noise of the ship.

Embodiments of the disclosure in yet another aspect provide a computer device, including a memory, a processor, and a computer program stored in the memory and capable of running on the processor, and the processor, when executing the computer program, implements the method for evaluating sonar self-noise at a ship design stage as described in the above embodiments.

Embodiments of the disclosure in still another aspect provide a non-transitory computer-readable storage medium on which a computer program is stored, and the computer program, when executed by the processor, implements the method for evaluating sonar self-noise at a ship design stage as described in the above embodiments.

Additional aspects and advantages of the disclosure will be given in part in the following description, some of which will become apparent from the following description or learned from the practice of the disclosure.

BRIEF DESCRIPTION OF FIGURES

The above and/or additional aspects and advantages of the disclosure will become apparent and easily understood from the description of embodiments in conjunction with the accompanying drawings below.

DETAILED DESCRIPTION

Figure 1:
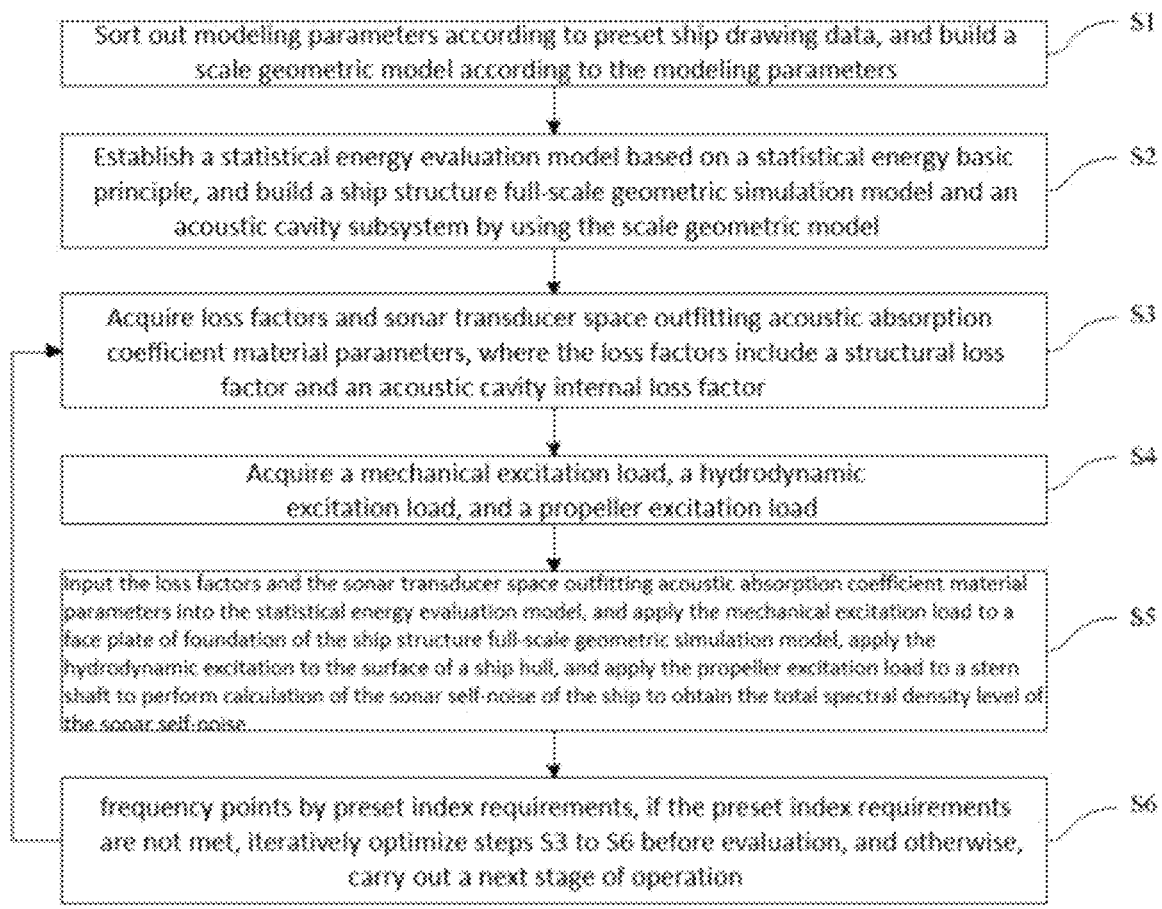
FIG. 1 is a flowchart of a method for evaluating sonar self-noise at a ship design stage according to one embodiment of the disclosure.

Embodiments of the disclosure will be described in detail below, and examples of the embodiments are shown in the drawings, where the same or similar reference signs from beginning to end indicate the same or similar element or elements having the same or similar function. The embodiments described below with reference to the accompanying drawings are exemplary and intended to explain the disclosure, but cannot be understood as limiting the disclosure.

The method and system for evaluating the sonar self-noise at the ship design stage proposed according to the embodiment of the disclosure will be described with reference to the accompanying drawings below, and firstly, the method for evaluating sonar self-noise at a ship design stage proposed according to the embodiment of the disclosure will be described with reference to the accompanying drawings.

FIG. 1 is a flowchart of a method for evaluating sonar self-noise at a ship design stage according to one embodiment of the disclosure.

Figure 2:
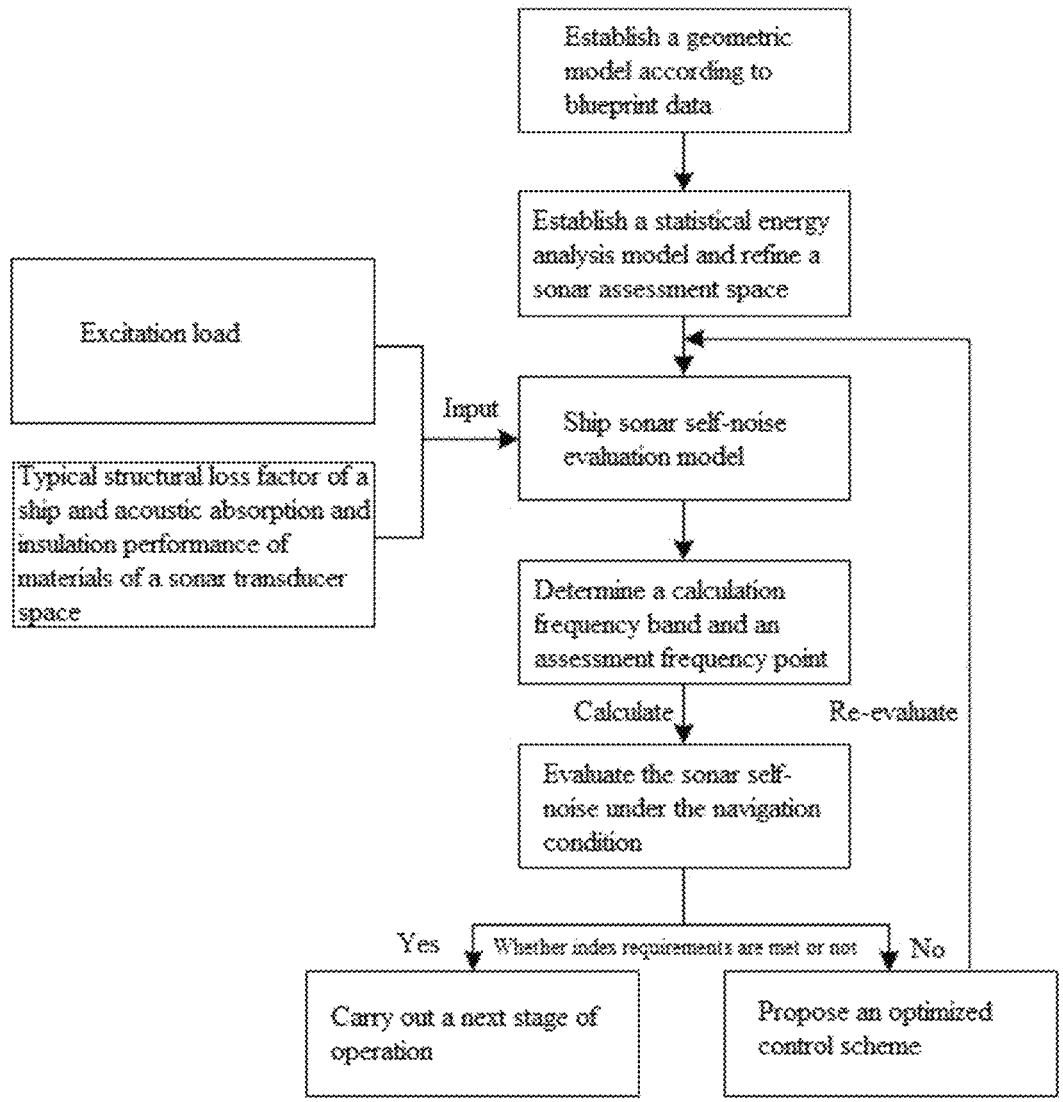
FIG. 2 is a flowchart of a method for evaluating sonar self-noise at a ship design stage according to one embodiment of the disclosure.

As shown in FIGS. 1 and 2, the method for evaluating sonar self-noise at a ship design stage includes the following steps:

In step S1, modeling parameters are sorted out according to preset ship blueprint data, and a scale geometric model is built according to the modeling parameters.

The scale geometric model at least includes a hull structure, a base, a bulkhead, a deck platform and a sonar transducer space structure, and the dimension of each structure and hull plating thickness parameters are determined.

In step S2, a statistical energy evaluation model is established based on a statistical energy basic principle, and a ship structure full-scale geometric simulation model and an acoustic cavity subsystem are built by using the scale geometric model.

Figure 3:
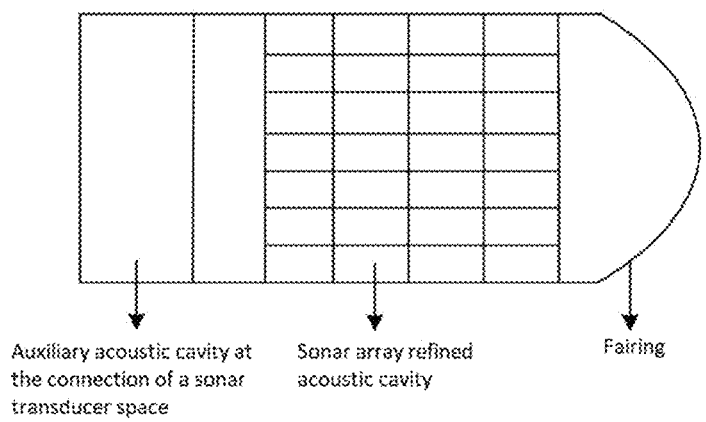
FIG. 3 is a schematic diagram of a sonar transducer space statistical energy analysis model according to one embodiment of the disclosure.

Further, in one embodiment of the disclosure, step S2 specifically includes:

step S201: establishing the statistical energy evaluation model based on the statistical energy basic principle, as shown in FIG. 3;

step S202: establishing the ship structure full-scale geometric simulation model according to the scale geometric model; and step S203: performing space fine division on a key-assessed sonar transducer space region in the ship structure full-scale geometric simulation model, and building the acoustic cavity subsystem according to spaces obtained after fine division.

In step S3, loss factors and sonar transducer space outfitting acoustic absorption coefficient material parameters are acquired, where the loss factors include a structural loss factor and an acoustic cavity internal loss factor.

Further, in one embodiment of the disclosure, step S3 specifically includes:

step S301: determining the structural loss factor and the acoustic cavity internal loss factor of the ship structure full-scale geometric simulation model based on a transient attenuation method by employing model experimental testing; and step S302: acquiring the sonar transducer space outfitting acoustic absorption coefficient material parameters in the ship structure full-scale geometric simulation model by employing an impedance tube testing method and a transfer matrix analysis method.

Figure 6:
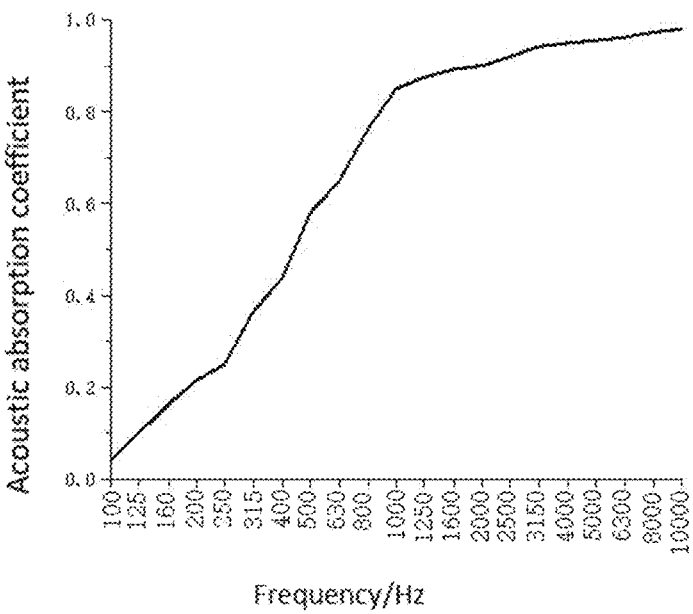
FIG. 6 is a spectrum diagram of an acoustic absorption coefficient of an outfitting material according to one embodiment of the disclosure.

Specifically, as shown in FIG. 6, the typical structural loss factors of the ship hull, the base, the bulkhead, a deck and the like are determined based on the transient attenuation method by employing the model experimental testing, and the acoustic cavity internal loss factor is calculated according to the following formula:

$$\eta = \frac{2.2}{T_{60}f} = \frac{13.82}{T_{60}\omega}$$

Where ω is a center circle frequency, $T_{60}$ is the internal reverberation time of an acoustic cavity, and f represents a frequency.

Then, acoustic absorption and insulation performance parameters of outfitting materials of a sonar transducer space are acquired by employing the impedance tube testing method and transfer matrix analysis method.

In step S4, a mechanical excitation load, a hydrodynamic excitation load, and a propeller excitation load are acquired.

Further, in one embodiment of the disclosure, step S4 specifically includes:

step S401: acquiring the mechanical excitation load of the ship structure full-scale geometric simulation model based on bench testing results of engine mount vibration of a parent device, where the mechanical excitation load includes a vibration acceleration level load and an acoustic power level load;

step S402: determining the hydrodynamic excitation load applied to the hull surface of the ship structure full-scale geometric simulation model at a preset speed according to the navigation condition of a ship design; and step S403: acquiring the propeller excitation of the ship structure full-scale geometric simulation model according to actual ship testing results.

Figure 4:
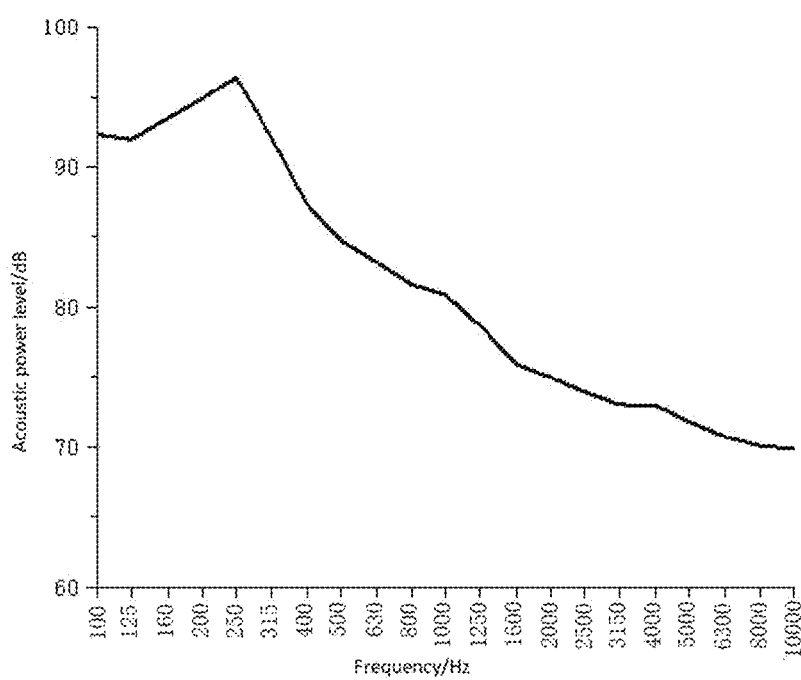
FIG. 4 is a spectrum curve diagram of a device acoustic power level according to one embodiment of the disclosure.
Figure 5:
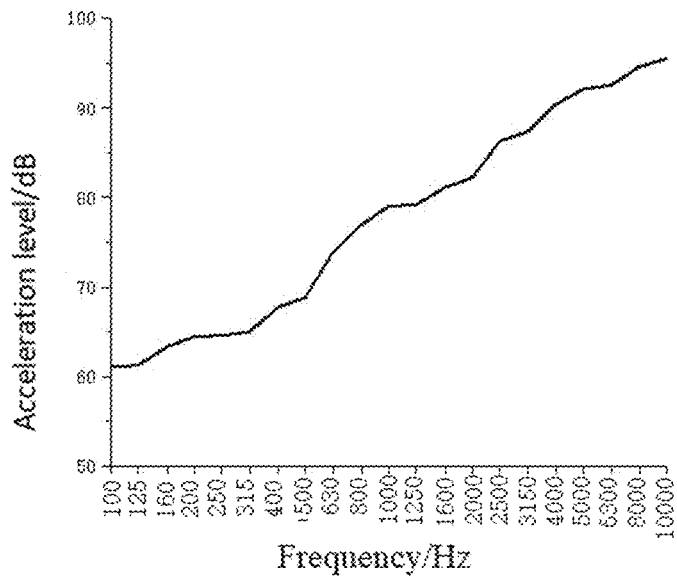
FIG. 5 is a spectrum curve diagram of a device acceleration level according to one embodiment of the disclosure.

That is, the vibration acceleration level and acoustic power level of a mechanical device are acquired based on the bench testing results of the engine mount vibration of the parent device, as shown in FIGS. 4 and 5; the fluid excitation at a certain speed applied to the hull surface is determined according to the navigation condition of the ship design; and the propeller excitation is acquired according to experimental testing results.

In step S5, the loss factors and the sonar transducer space outfitting acoustic absorption coefficient material parameters are input into the statistical energy evaluation model, and the mechanical excitation load is applied to a face plate of foundation of the ship structure full-scale geometric simulation model, the hydrodynamic excitation is applied to the surface of the ship hull, and the propeller excitation load is applied to a stern shaft to perform calculation of the sonar self-noise of the ship to obtain the total spectral density level of the sonar self-noise.

Further, in one embodiment of the disclosure, the calculation of the sonar self-noise of the ship in step S5 specifically includes:

setting frequency response analysis to ⅓ octave frequency, setting a calculation frequency band to 100 Hz to 10 kHz, and performing calculation of the sonar self-noise of the ship;

converting calculated acoustic pressure level results of each acoustic cavity obtained by division in the sonar transducer space into spectral density levels; and performing energy superposition on multiple spectral density level results to obtain the total spectral density level of the sonar self-noise.

Figure 7:
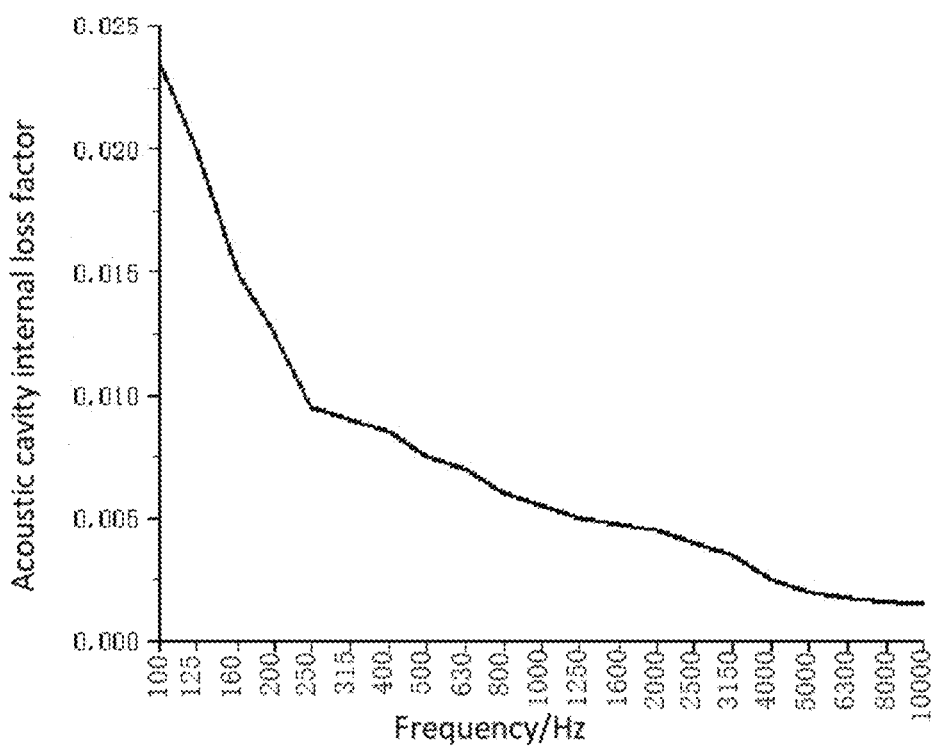
FIG. 7 is a curve diagram of an internal loss factor of a structural subsystem as a function of frequency according to one embodiment of the disclosure.

Specifically, as shown in FIG. 7, the typical structural loss factor parameters, the acoustic performance parameters of the sonar transducer space outfitting material and the like are inputted according to the ship structure statistical energy analysis model, and the mechanical excitation, the hydrodynamic excitation, the propeller excitation and the like are applied;

the frequency response analysis is set to the ⅓ octave frequency, the calculation frequency band is set to 100 Hz to 10 kHz, and the calculation of the sonar self-noise of the ship is performed;

the calculated acoustic pressure level results of each acoustic cavity obtained by division in the sonar transducer space are converted into the spectral density levels, and the calculation formula is as follows:

$$L_{Di} = L_{Pi} - 10\log\left(f_i \sqrt{a} - \frac{f_i}{\sqrt{a}}\right)$$

Where $$a = 2^{\frac{1}{3}},$$

$f_i$ is the frequency at the $i^{th}$ frequency point, $L_{Pi}$ is the acoustic pressure level at the $f_i$ frequency, and $L_{Di}$ is the spectral density level at the $f_i$ frequency; and the energy superposition is performed on the spectral density level results of each acoustic cavity obtained by division in the sonar transducer space to obtain the total spectral density level of the sonar self-noise, and the energy average calculation formula is as follows:

$$L_D = 10\log\left[\sum_{i=1}^{n}\left(10^{L_{in}/10}\right)\right]$$

Where $L_D$ is the total spectral density level of sonar self-noise.

In step S6: spectral density level calculation results at 100 Hz, 1 kHz, and 10 kHz frequency points are evaluated by preset index requirements, if the preset index requirements are not met, steps S3 to S6 are iteratively optimized before evaluation, and otherwise, a next stage of operation is carried out.

Further, in one embodiment of the disclosure, step S6 specifically includes:

average energy values at 100 Hz, 1 kHz, and 10 kHz frequency points in the total spectral density level of the sonar self-noise are solved, if the average energy value is less than 3 dB or more of the preset index requirement, the next stage of operation is continued, where the preset index requirement can be implemented, if the average energy value is less than 3 dB or less of the preset index requirement, the next stage of operation is continued, where the preset index requirement has a risk, and otherwise, the preset index requirement has a high risk, then steps S3 to S6 are iteratively optimized before evaluation.

Figure 8:
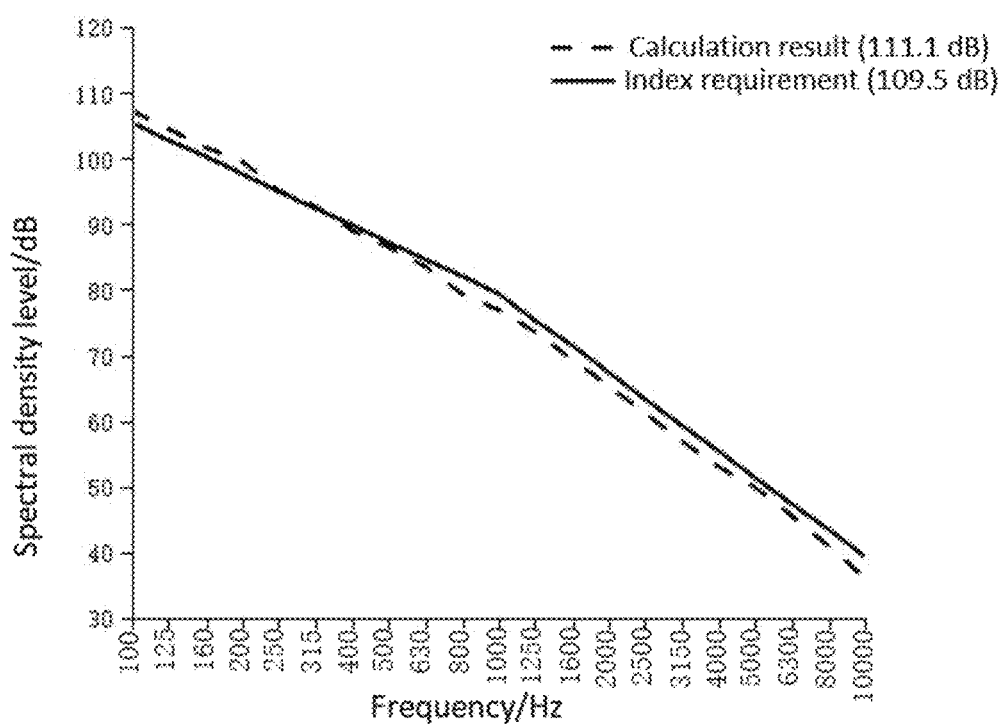
FIG. 8 is a schematic diagram of full-band evaluation results of sonar self-noise of a ship according to one embodiment of the disclosure.

Specifically, as shown in FIG. 8, the spectral density level calculation results at typical frequency points such as 100 Hz, 1 kHz, and 10 kHz are evaluated by the index requirements;

firstly, the spectral density level average value of the acoustic cavity of a refined sonar assessment space is assessed by comparing with evaluation indexes;

if the calculation result is less than 3 dB or more of the index requirement, it indicates that there is a relatively low risk of achieving sonar self-noise indexes and the next stage of operation can be continued;

if the calculation result is less than 3 dB or less of the index requirement, there is a certain risk in achieving the sonar self-noise indexes, and it is necessary to focus on the noise of the sonar transducer space, and the next stage of operation can be continued, but the noise will be focused on as one of risk points in the next stage of operation;

if the calculation result is greater than the index requirement, it indicates that there is a high risk of achieving the sonar self-noise indexes, and it is necessary to redesign a vibration and noise reduction scheme for the sonar self-noise;

if the evaluation results have a relatively high risk of achieving the sonar self-noise indexes under the assessment of navigation condition, the statistical energy evaluation model for the sonar self-noise of the ship can be optimized from the following three aspects: performing vibration reduction treatment on an excitation source or employing a low-noise device; employing an acoustic absorption material, damping steel, and laying a damping layer on a main conduction path and the sonar transducer space region; and finally, the statistical energy evaluation model for the sonar self-noise of the ship is optimized according to optimization suggestions, and then steps S5 and S6 are repeated.

In summary, according to the method for evaluating sonar self-noise at a ship design stage proposed according to the embodiment of the disclosure, the spectral density level of a ship sonar transducer space is pre-estimated under the navigation condition according to a ship design scheme with mechanical vibration noise excitation, fluid excitation, and propeller excitation as inputs, and the risk level of sonar self-noise indexes at the ship design stage is evaluated by comparing with sonar self-noise index requirements, thereby effectively improving the prediction efficiency and accuracy of the sonar self-noise of the ship.

Secondly, the system for evaluating sonar self-noise at a ship design stage proposed according to the embodiment of the disclosure is described with reference to the accompanying drawings.

Figure 9:
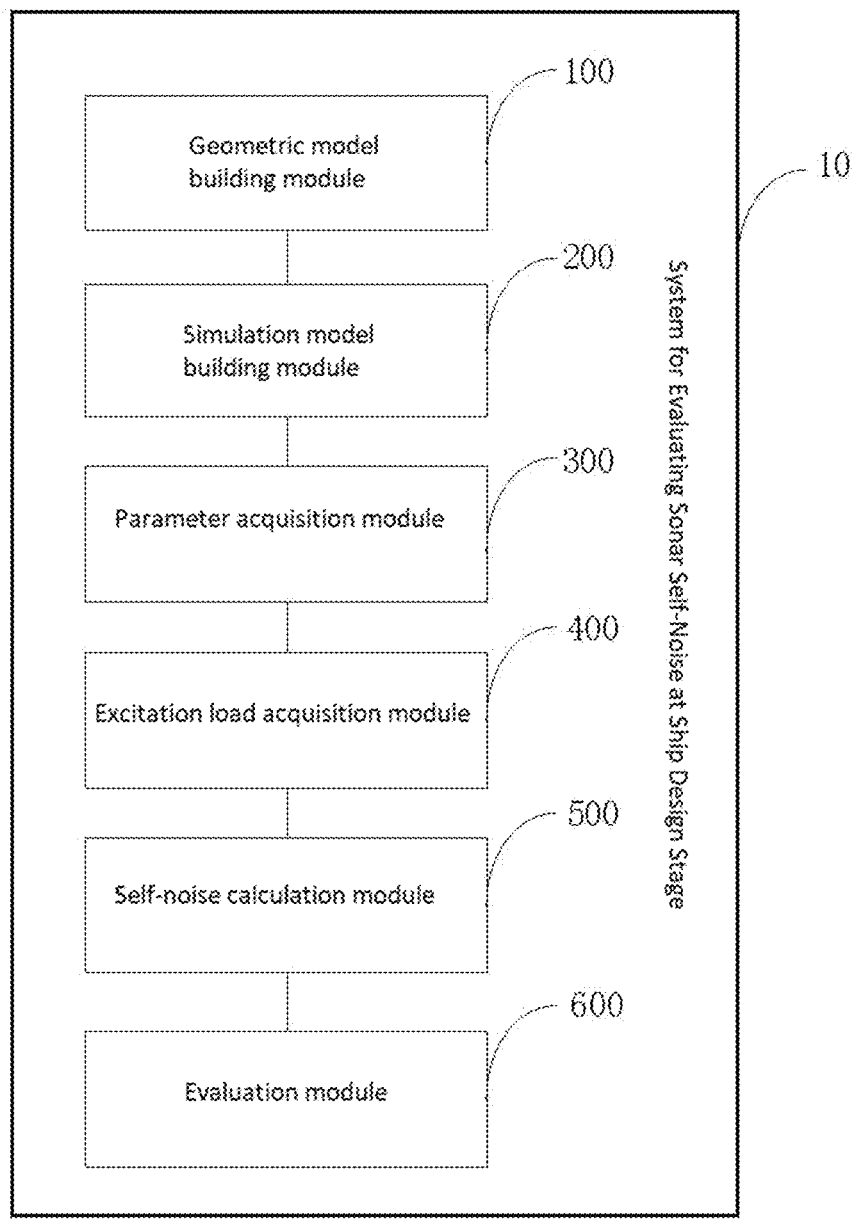
FIG. 9 is a structural schematic diagram of a system for evaluating sonar self-noise at a ship design stage according to one embodiment of the disclosure.

FIG. 9 is a structural schematic diagram of a system for evaluating sonar self-noise at a ship design stage in one embodiment of the disclosure.

As shown in FIG. 9, the system 10 includes: a geometric model building module 100, a simulation model building module 200, a parameter acquisition module 300, an excitation load acquisition module 400, a self-noise calculation module 500, and an evaluation module 600.

The geometric model building module 100 is configured to sort out modeling parameters according to preset ship blueprint data, and build a scale geometric model according to the modeling parameters. The simulation model building module 200 is configured to establish a statistical energy evaluation model based on a statistical energy basic principle, and build a ship structure full-scale geometric simulation model and an acoustic cavity subsystem by using the scale geometric model. The parameter acquisition module 300 is configured to acquire loss factors and sonar transducer space outfitting acoustic absorption coefficient material parameters, where the loss factors include a structural loss factor and an acoustic cavity internal loss factor. The excitation load acquisition module 400 is configured to acquire a mechanical excitation load, a hydrodynamic excitation load, and a propeller excitation load. The self-noise calculation module 500 is configured to input the loss factors and the sonar transducer space outfitting acoustic absorption coefficient material parameters into the statistical energy evaluation model, and apply the mechanical excitation load to a face plate of foundation of the ship structure full-scale geometric simulation model, apply the hydrodynamic excitation load to the surface of a ship hull, and apply the propeller excitation load to a stern shaft to perform calculation of the sonar self-noise of the ship to obtain the total spectral density level of the sonar self-noise. The evaluation module 600 is configured to evaluate spectral density level calculation results at 100 Hz, 1 kHz, and 10 kHz frequency points by preset index requirements, if the preset index requirements are not met, iteratively optimize the parameter acquisition module to the evaluation module before evaluation, and otherwise, carry out the next stage of operation.

It should be noted that the above explanation of the embodiment of the method for assessing sonar self-noise at a ship design stage is also applicable to the system of the embodiment, which will not be repeated here.

According to the system for evaluating sonar self-noise at a ship design stage proposed according to the embodiment of the disclosure, the spectral density level of a ship sonar transducer space is pre-estimated under the navigation condition according to a ship design scheme with mechanical vibration noise excitation, fluid excitation, and propeller excitation as inputs, and the risk level of sonar self-noise indexes at the ship design stage is evaluated by comparing with sonar self-noise index requirements, thereby effectively improving the prediction efficiency and accuracy of the sonar self-noise of the ship.

In order to implement the above embodiments, the disclosure also proposes a computer device, including a memory, a processor, and a computer program stored in the memory and capable of running on the processor, and the processor, when executing the computer program, implements the method for evaluating sonar self-noise at a ship design stage as described in the above embodiments.

In order to implement the above embodiments, the disclosure also proposes a non-transitory computer-readable storage medium on which a computer program is stored, and the computer program, when executed by the processor, implements the method for evaluating sonar self-noise at a ship design stage as described in the above embodiments.

In the descriptions of this specification, descriptions of reference terms such as "one embodiment", "some embodiments", "an example", "a specific example" or "some examples" means that specific features, structures, materials, or characteristics described with reference to the embodiment or the example is included in at least one embodiment or example of the disclosure. In this specification, the schematic expressions of the above terms do not necessarily refer to the same embodiment or example. Moreover, the described specific features, structures, materials, or characteristics may be combined in a proper manner in any one embodiment or example or N embodiments or examples. Furthermore, without contradiction, those skilled in the art may integrate and combine different embodiments or examples described in this specification and the features of different embodiments or examples.

Furthermore, the terms "first" and "second" are only used for descriptive purposes and cannot be understood as indicating or implying relative importance or implying the number of technical features indicated. Therefore, the features defined as "first" and "second" may include at least one of these features explicitly or implicitly. In the description of the disclosure, "N" means at least two, for example, two and three, unless otherwise specified.

Any process or method in the flowchart or otherwise described herein can be understood as representing a module, fragment, or part of a code that includes one or N executable instructions used for implementing custom logical functions or steps of a process, and the scope of the preferred implementations of the disclosure includes additional implementations, where the functions may be performed not in order indicated or discussed, including in a substantially simultaneous manner or in reverse order according to the functions involved, which should be understood by those skilled in the art to which the embodiments of the disclosure belong.

The logic and/or steps represented in the flowchart or otherwise described here, such as a sequencing list of the executable instructions that can be considered to implement the logical functions, can be specifically implemented in any computer-readable medium for instruction execution systems, apparatuses or devices (such as computer-based systems, systems including processors, or other systems that can read and execute instructions from the instruction execution systems, apparatuses, or devices) to use, or used in combination with these instruction execution systems, apparatuses, or devices. As far as this specification is concerned, the "computer-readable medium" may be any apparatus that may include, store, communicate, propagate or transmit programs for use by or in combination with the instruction execution systems, apparatuses or devices. More specific examples of the computer-readable medium (non-exhaustive list) include: an electrical connection unit (electronic apparatus) with one or N wirings, a portable computer cartridge (magnetic apparatus), a random access memory (RAM), a read-only memory (ROM), an erasable programmable read-only memory (EPROM or flash memory), a fiber optic apparatus, and a portable compact disc read-only memory (CDROM). In addition, the computer-readable medium may even be paper or other suitable media on which the program can be printed, as the program can be obtained electronically, for example, by optically scanning the paper or the other media, followed by editing, interpreting, or processing in other suitable ways if necessary, and then stored in a computer memory.

It should be understood that various parts of the disclosure can be implemented in hardware, software, firmware, or a combination thereof. In the above implementations, N steps or methods can be implemented in software or firmware stored in the memory and executed by a suitable instruction execution system. For example, if implemented in hardware, as in another implementation, the N steps or methods can be implemented with any of the following techniques well known in the art or a combination thereof: a discrete logic circuit with a logic gate for implementing logic functions on a data signal, a specialized integrated circuit with a suitable combination logic gate, a programmable gate array (PGA), a field programmable gate array (FPGA) and the like.

Those of ordinary skill in the art should understand that all or part of the steps of the method in the foregoing embodiment can be implemented by a program instructing related hardware. The program can be stored in a computer-readable storage medium. The program, when executed, includes one or a combination of the steps of the method embodiments.

Furthermore, each functional unit in each embodiment of the disclosure may be integrated into one processing module, or each unit may physically exist separately, or two or more units can be integrated into one module. The integrated module may be implemented in the form of hardware, or may be implemented in a form of a software functional module. When implemented in the form of the software functional module and sold or used as an independent product, the integrated module may also be stored in a computer-readable storage medium.

The storage medium mentioned above may be a read-only memory, a magnetic disk, an optical disc or the like. Although embodiments of the disclosure have been shown and described above, it can be understood that the above embodiments are exemplary and cannot be understood as limiting the disclosure. Those of ordinary skill in the art can make changes, modifications, substitutions, and variations to the above embodiments within the scope of the disclosure.

What is claimed is:

1. A method for evaluating sonar self-noise at a ship design stage to ensure a design of ship sonar system is low noise, comprising the following steps:
   step S1: sorting out modeling parameters according to preset ship blueprint data, and building a scale geometric model according to the modeling parameters;
   step S2: establishing a statistical energy evaluation model based on a statistical energy basic principle, and building a ship structure full-scale geometric simulation model and an acoustic cavity subsystem by using the scale geometric model;
   step S3: acquiring loss factors and sonar transducer space outfitting acoustic absorption coefficient material parameters, wherein the loss factors comprise a structural loss factor and an acoustic cavity internal loss factor;
   step S4: acquiring a mechanical excitation load, a hydrodynamic excitation load, and a propeller excitation load;
   step S5: inputting the loss factors and the sonar transducer space outfitting acoustic absorption coefficient material parameters into the statistical energy evaluation model, and applying the mechanical excitation load to a face plate of foundation of the ship structure full-scale geometric simulation model, applying the hydrodynamic excitation load to the surface of a ship hull, and applying the propeller excitation load to a stern shaft to perform calculation of the sonar self-noise of the ship to obtain the total spectral density level of the sonar self-noise; and
   step S6: evaluating spectral density level calculation results at 100 Hz, 1 kHz, and 10 kHz frequency points by preset index requirements, if the preset index requirements are not met, iteratively optimizing steps S3 to S6 before evaluation, and otherwise, carrying out a next stage of operation, wherein a risk level of sonar self-noise indexes at the ship design stage is evaluated based on the preset index requirements; wherein the risk is low when preset index requirements are met;
   wherein the calculation of the sonar self-noise of the ship in step S5 specifically comprises: setting frequency response analysis to ⅓ octave frequency, setting a calculation frequency band to 100 Hz to 10 kHz, and performing calculation of the sonar self-noise of the ship; converting calculated acoustic pressure level results of each acoustic cavity obtained by division in the sonar transducer space into spectral density levels; and performing energy superposition on multiple spectral density level results to obtain the total spectral density level of the sonar self-noise.

2. The method for evaluating sonar self-noise at a ship design stage according to claim 1, wherein the scale geometric model comprises a hull structure, a base, a bulkhead, a deck platform, a sonar transducer space structure, and the dimension of each structure and hull plating thickness parameters.

3. The method for evaluating sonar self-noise at a ship design stage according to claim 1, wherein step S2 specifically comprises:
   step S201: establishing the statistical energy evaluation model based on the statistical energy basic principle;
   step S202: establishing the ship structure full-scale geometric simulation model according to the scale geometric model; and
   step S203: performing space fine division on a key-assessed sonar transducer space region in the ship structure full-scale geometric simulation model, and building the acoustic cavity subsystem according to spaces obtained after fine division.

4. The method for evaluating sonar self-noise at a ship design stage according to claim 1, wherein step S3 specifically comprises:
   step S301: determining the structural loss factor and the acoustic cavity internal loss factor of the ship structure full-scale geometric simulation model based on a transient attenuation method by employing model experimental testing; and
   step S302: acquiring the sonar transducer space outfitting acoustic absorption coefficient material parameters in the ship structure full-scale geometric simulation model by employing an impedance tube testing method and a transfer matrix analysis method.

5. The method for evaluating sonar self-noise at a ship design stage according to claim 1, wherein step S4 specifically comprises:
   step S401: acquiring the mechanical excitation load of the ship structure full-scale geometric simulation model based on bench testing results of engine mount vibration of a parent device, wherein the mechanical excitation load comprises a vibration acceleration level load and an acoustic power level load;
   step S402: determining the hydrodynamic excitation load applied to the hull surface of the ship structure full-scale geometric simulation model at a preset speed according to the navigation condition of a ship design; and
   step S403: acquiring the propeller excitation load of the ship structure full-scale geometric simulation model according to actual ship testing results.

6. The method for evaluating sonar self-noise at a ship design stage according to claim 1, wherein step S6 specifically comprises:
   solving average energy values at 100 Hz, 1 kHz, and 10 kHz frequency points in the total spectral density level of the sonar self-noise, if the average energy value is less than 3 dB or more of the preset index requirement, continuing the next stage of operation, wherein the preset index requirement can be implemented, if the average energy value is less than 3 dB or less of the preset index requirement, continuing the next stage of operation, wherein the preset index requirement has a risk, and otherwise, the preset index requirement has a high risk, then iteratively optimizing steps S3 to S6 before evaluation.

7. A computer device, comprising a memory, a processor, and a computer program stored in the memory and capable of running on the processor, wherein the processor, when executing the computer program, implements the method for evaluating sonar self-noise at a ship design stage according to claim 1.

8. A non-transitory computer-readable storage medium on which a computer program is stored, wherein the computer program, when executed by the processor, implements the method for evaluating sonar self-noise at a ship design stage according claim 1.

9. A system for evaluating sonar self-noise at a ship design stage to ensure a design of ship sonar system is low noise, comprising:
- a geometric model building module, configured to sort out modeling parameters according to preset ship blueprint data, and build a scale geometric model according to the modeling parameters;
- a simulation model building module, configured to establish a statistical energy evaluation model based on a statistical energy basic principle, and build a ship structure full-scale geometric simulation model and an acoustic cavity subsystem by using the scale geometric model;
- a parameter acquisition module, configured to acquire loss factors and sonar transducer space outfitting acoustic absorption coefficient material parameters, wherein the loss factors comprise a structural loss factor and an acoustic cavity internal loss factor;
- an excitation load acquisition module, configured to acquire a mechanical excitation load, a hydrodynamic excitation load, and a propeller excitation load;
- a self-noise calculation module, configured to input the loss factors and the sonar transducer space outfitting acoustic absorption coefficient material parameters into the statistical energy evaluation model, and apply the mechanical excitation load to a face plate of foundation of the ship structure full-scale geometric simulation model, apply the hydrodynamic excitation load to the surface of a ship hull, and apply the propeller excitation load to a stern shaft to perform calculation of the sonar self-noise of the ship to obtain the total spectral density level of the sonar self-noise; and
- an evaluation module, configured to evaluate spectral density level calculation results at 100 Hz, 1 kHz, and 10 kHz frequency points by preset index requirements, if the preset index requirements are not met, iteratively optimizing the parameter acquisition module to the evaluation module before evaluation, and otherwise, carrying out the next stage of operation, wherein a risk level of sonar self-noise indexes at the ship design stage is evaluated based on the preset index requirements; wherein the risk is low when preset index requirements are met;
wherein the calculation of the sonar self-noise of the ship specifically comprises: setting frequency response analysis to ⅓ octave frequency, setting a calculation frequency band to 100 Hz to 10 kHz, and performing the calculation of the sonar self-noise of the ship; converting calculated acoustic pressure level results of each acoustic cavity obtained by division in the sonar transducer space into spectral density levels; and
performing energy superposition on multiple spectral density level results to obtain the total spectral density level of the sonar self-noise.

* * * * *